US010440183B1

United States Patent
Keen et al.

(10) Patent No.: US 10,440,183 B1
(45) Date of Patent: Oct. 8, 2019

(54) COGNITIVE ROUTING OF CALLS BASED ON DERIVED EMPLOYEE ACTIVITY

(71) Applicant: International Business Machines Corporation, Armonk, NY (US)

(72) Inventors: Martin G. Keen, Cary, NC (US); Adam Smye-Rumsby, Reading, PA (US); Hernan A. Cunico, Holly Springs, NC (US); Paul A. R. Frank, Berlin (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 15/995,349

(22) Filed: Jun. 1, 2018

(51) Int. Cl.
*H04M 3/523* (2006.01)
*G06Q 10/06* (2012.01)
*H04M 3/54* (2006.01)

(52) U.S. Cl.
CPC .. *H04M 3/5232* (2013.01); *G06Q 10/063114* (2013.01); *H04M 3/548* (2013.01)

(58) Field of Classification Search
CPC ................ H04M 3/5232; H04M 3/5233
See application file for complete search history.

(56) References Cited

U.S. PATENT DOCUMENTS

| 6,061,506 | A | 5/2000 | Wollaston et al. |
| 7,023,979 | B1 | 4/2006 | Wu et al. |
| 7,158,628 | B2 | 1/2007 | McConnell et al. |
| 7,787,609 | B1* | 8/2010 | Flockhart ............ H04M 3/5233 379/265.01 |
| 8,675,860 | B2* | 3/2014 | Eicholz .............. G06Q 50/2057 379/265.01 |
| 2005/0195960 | A1* | 9/2005 | Shaffer ............... H04M 3/5232 379/265.02 |
| 2007/0195944 | A1 | 8/2007 | Korenblit et al. |
| 2009/0254971 | A1 | 10/2009 | Herz et al. |
| 2010/0158238 | A1* | 6/2010 | Saushkin ............... G06Q 10/06 379/265.12 |
| 2010/0318465 | A1 | 12/2010 | Nielsen et al. |

(Continued)

OTHER PUBLICATIONS

Schut, M.H. et al., "Biometrics for Emotion Detection (BED): Exploring the Combination of Speech and ECG," In Proceedings of the 1st International Workshop on Bio-inspired Human-Machine Interfaces and Healthcare Applications-B-Interface, Jan. 21, 2010, 8 pg. INSTICC Press.

(Continued)

*Primary Examiner* — Nafiz E Hoque
(74) *Attorney, Agent, or Firm* — Cuenot, Forsythe & Kim, LLC (57) ABSTRACT

Cognitive routing of an incoming call includes analyzing respective captured audio and video data related to each of a plurality of agents of an enterprise, each agent associated with a respective mobile device; and determining a respective current activity in which each agent is engaged based on the agent's related captured audio and video data. Such routing also includes selecting one of the plurality of agents to receive an incoming call based at least in part on the determined respective current activity in which each agent is engaged; and routing an incoming call to the mobile device associated with the selected one agent.

19 Claims, 6 Drawing Sheets

(56) References Cited

U.S. PATENT DOCUMENTS

2013/0083915 A1* 4/2013 Flockhart ............ H04M 3/5233
379/265.11
2013/0090965 A1 4/2013 Rivere
2014/0140497 A1* 5/2014 Ripa ................... H04M 3/5133
379/265.06
2015/0350445 A1* 12/2015 Flannery ............. H04M 3/5232
379/265.12

OTHER PUBLICATIONS

"Custom Call Routing and Answering Rules," [Online] RingCentral, Inc. © 1999-2018 [retrieved Feb. 22, 2018], retrieved from the Internet: <https://www.ringcentral.com/office/features/answering-rules/overview.html>, 4 pg.

* cited by examiner

COGNITIVE ROUTING OF CALLS BASED ON DERIVED EMPLOYEE ACTIVITY

BACKGROUND

The present invention relates to routing communication sessions to one of a plurality of agents, and more specifically, to deriving agents' current activities in order to select the agent to which the communication session is routed.

With the proliferation of mobile phones, many enterprises are replacing desk phones with a central phone system that routes incoming calls directly to employee mobile devices. By the nature of mobile devices, an on-shift employee could be involved in many different types of activities when they receive an incoming phone call. Many of these activities may make it inappropriate to answer the call.

SUMMARY

A method includes analyzing, by a computer, respective captured audio and video data related to each of a plurality of agents of an enterprise, each agent associated with a respective mobile device; determining, by the computer, a respective current activity in which each agent is engaged based on the agent's related captured audio and video data; selecting, by the computer, one of the plurality of agents to receive an incoming call based at least in part on the determined respective current activity in which each agent is engaged; and routing, by the computer, an incoming call to the mobile device associated with the selected one agent.

A system includes a processor programmed to initiate executable operations. In particular, the executable operations include analyzing respective captured audio and video data related to each of a plurality of agents of an enterprise, each agent associated with a respective mobile device; determining a respective current activity in which each agent is engaged based on the agent's related captured audio and video data; selecting one of the plurality of agents to receive an incoming call based at least in part on the determined respective current activity in which each agent is engaged; and routing an incoming call to the mobile device associated with the selected one agent.

A computer program product includes a computer readable storage medium having program code stored thereon. In particular, the program code executable by a data processing system to initiate operations including: analyzing, by the data processing system, respective captured audio and video data related to each of a plurality of agents of an enterprise, each agent associated with a respective mobile device; determining, by the data processing system, a respective current activity in which each agent is engaged based on the agent's related captured audio and video data; selecting, by the data processing system, one of the plurality of agents to receive an incoming call based at least in part on the determined respective current activity in which each agent is engaged; and routing, by the data processing system, an incoming call to the mobile device associated with the selected one agent.

DETAILED DESCRIPTION

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being). The terms "employee" and "agent" are used herein interchangeably with the term "user".

With the proliferation of mobile phones, many enterprises are replacing desk phones with a central phone system that routes incoming calls directly to employee mobile devices. By the nature of mobile devices, an on-shift employee could be involved in many different types of activities when the enterprise receives an incoming phone call. Many of these activities may make it inappropriate to answer the call. As described herein, a system and/or method can be implemented which derives the activity an employee is engaged in and when an incoming call is received, the call is routed to the mobile device of the employee that is in the best situation to receive the phone call. The contemplated system does more than merely check if the agent is presently on a call or not. Rather a cognitive system is trained to recognize a number of different activities that an agent may be engaged in so that real-time audio and video data can be analyzed to classify the agent as engaging in one of those recognizable activities. Based on the deduced activity of each of a plurality of different agents, one is selected to receive an incoming call.

Figure 1:
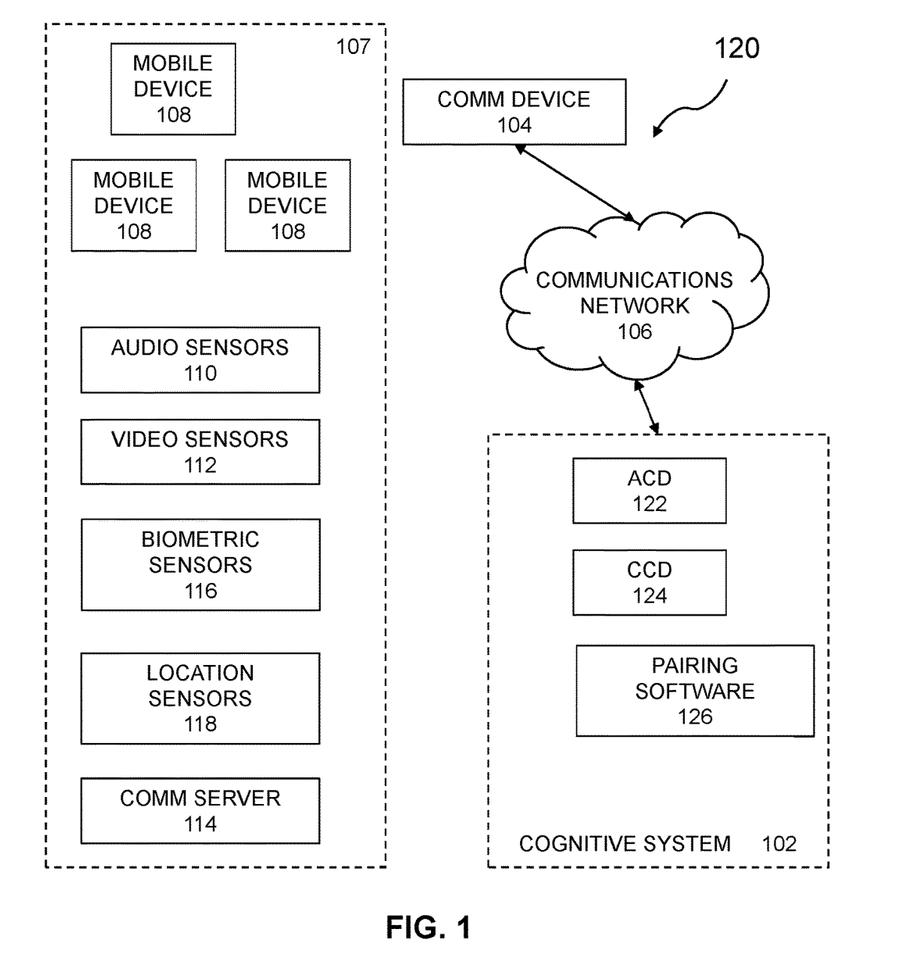
FIG. 1 is a block diagram illustrating an example of a network data processing system in accordance with the principles of the present disclosure.

FIG. 1 is a block diagram illustrating an example of a network data processing system 120 that includes a communication network 106. The communication network 106 is the medium used to provide communications links between various devices and data processing systems connected together within the computing environment (or network data processing system, etc.) 120. The communication network 106 may include connections, such as wire, wireless communication links, or fiber optic cables. The communication network 106 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

One device in the network data processing system 120 is a communications device 104 such as a telephone, mobile phone, IP phone, tablet, computer, or other similar devices. An enterprise 107 can, for example, be a store, a warehouse, or other place of employment. The enterprise 107 can have a plurality of agents that are located within a physical environment of the enterprise. Each agent can be associated with a respective mobile device 108 that they can use to communicate with other communication devices. In particular, an incoming call from the communications device 104 can be routed to one of the mobile devices 108. Also, within the enterprise 107 a number of sensors can be present which capture data about the activities currently being performed within the enterprise. Audio sensors 110 can be used to capture audio data at different locations within the enterprise 107. In particular, the audio sensors 110 can be a microphone within each of the mobile devices 108. In this way, audio data can be collected and can be directly associated with a particular agent because that agent is known to be carrying the mobile device that captures a particular stream of audio data. Video sensors 112 may also be present within the enterprise 107. The video sensors 112 can include body cameras or CCTV cameras, for example, or can include augmented-reality (AR) glasses that have video capturing capabilities.

If one of the video sensors 112 is associated with a particular agent of the enterprise (e.g., AR glasses), then the captured video stream can be easily associated with that agent. If one of the video sensors 112 is more general in nature (e.g., CCTV cameras), then facial recognition algorithms or similar video analysis can be used to identify one or more agents in a particular stream of video data. Biometric sensors 116 such as, for example, a smart watch can be used to capture current physiological data about an agent of the enterprise. Location determining services 118 can be utilized to determine where each agent is currently located within the enterprise. This service can, for example, be tied to the video sensors 112 so that the location of an agent is determined by analysis of the video data. However, an alternative is to use a location services feature already present within the mobile devices 108. As mentioned above, when a particular mobile device is known to be associated with a particular agent, then data captured from sensors of the mobile device can be directly and easily associated with that particular agent.

A cognitive system 102 can include a conventional automated call distribution (ACD) 122 to accept incoming calls to the enterprise 107 via the network 106. The ACD 122 can provide a central number for the enterprise that callers can call to reach one of the agents of the enterprise. As described below, the cognitive system 102 also includes a cognitive call dispatcher (CCD) 124 that selects which of the mobile devices 108 to route the incoming call to. In an embodiment in which the cognitive system 102 does not communicate directly with the various sensors described earlier, the enterprise 107 can include a communication server 114 which collects the various sensor data and communicates with the cognitive system 102.

The cognitive system 102 can also include pairing software 126 which allows one or more devices to be paired with the CCD 124. Using technology such as BLUETOOTH, for example, a mobile device, smart watch, AR glasses, etc. can be paired or linked with the CCD 124 so that the device can communicate with the CCD 124 and transmit audio data, video data, biometric data, etc. to the CCD 124.

Figure 2A:
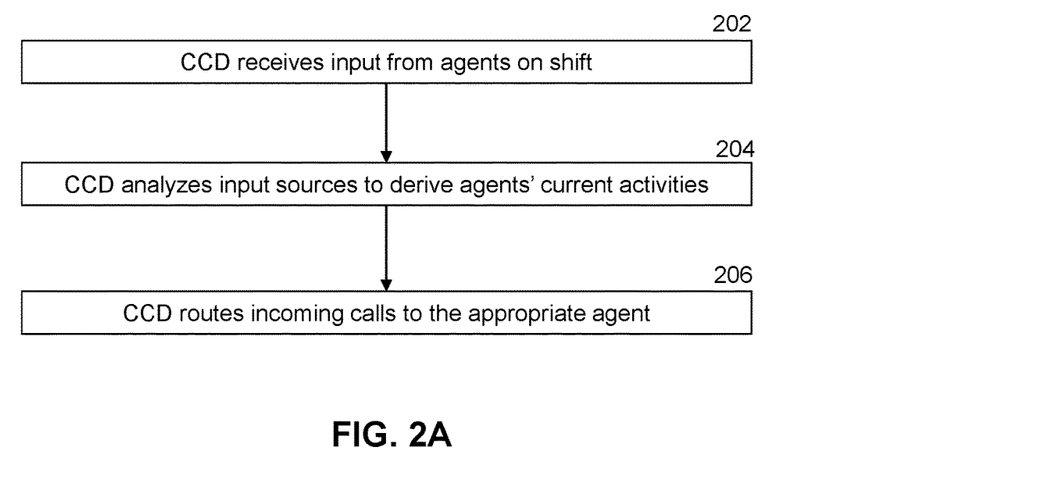
FIGS. 2A-2D are flowcharts illustrating example methods of providing cognitive call routing, in accordance with the principles of the present disclosure.

FIG. 2A provides a high level flowchart of providing cognitive call routing in accordance with the principles of the present disclosure. Referring to step 202 of FIG. 2A, the CCD receives input from agents currently at the enterprise. For example, the agents can be those currently on shift as an employee of the enterprise. As described below, the agent can have one or more mobile devices that are associated with the agent. That association-related data can be stored in a database, for example, that is accessible by the CCD. If the mobile device is a personal device of the agent, then the association between the agent and the device can be stored previously. In some alternatives, an agent can be assigned a mobile device when coming on shift and the association between the mobile device and the agent's identity is then established and stored. The mobile device can then be paired with the CCD to enable communication between the mobile device and the CCD. Data such as audio and video data can then be transmitted from the mobile device to the CCD which then derives that the data is associated with the agent using that mobile device.

In step 204, the CCD analyzes the data being received from the agents' mobile devices and derives the agents' current activities. As explained below, the analysis can include visual recognition, passive listening analysis, location analysis, and biometric analysis. The CCD utilizes these different analysis modalities to derive a current activity of each of the agents. In step 206, the different activities are analyzed to determine which of the agents is the most appropriate agent to handle an incoming call.

Figure 2B:
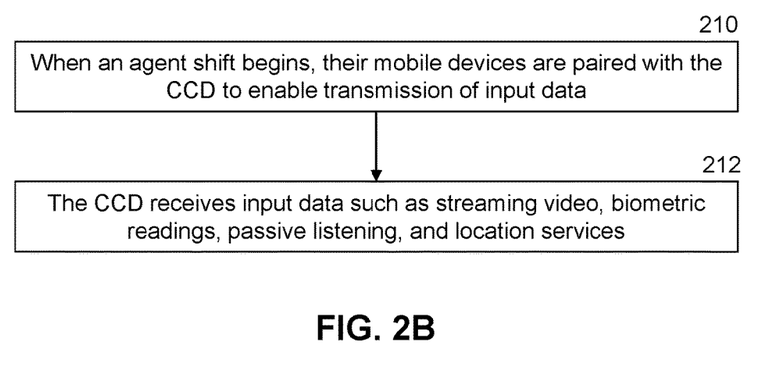

FIG. 2B provides more details about step 202 from FIG. 2A. In step 210, the mobile devices associated with an agent are paired with the CCD. As mentioned above, this pairing can occur via near-field communication (NFC) techniques such as BLUETOOTH for example or can utilize other technologies such as Wi-Fi. As a result of the pairing, the mobile devices and the CCD establish a communication path between the two so that the CCD can receive data, in step 212, from the mobile devices and recognize which mobile device (and agent) the data relates to. The data can be a variety of different information and can include the time of day, the agents' work schedules, video data and audio from a physical environment occupied by the agents, biometric-related data about the agents' physiological states, and location information about the location of the agents at the present time.

In general, the cognitive system is an artificial intelligence system that classifies the data it receives through analysis of that data. In the present disclosure, the data is analyzed to determine an activity an agent is currently engaged in. Taking the video analysis, for example, the cognitive system is initially trained to recognize a limited number of "possible" activities of an agent. The presence or absence of certain objects in an image may be pertinent. The proximity of the agent to one or more items in the environment may be pertinent. The cognitive system can be trained with a variety of images to associate certain data with one or more defined activities. The specific activities which the cognitive system can recognize can vary based on the enterprise. As an example, the enterprise could be a store which has employees that can interact with customers in person, interact with customers via a device, stock the storeroom, or take a break in a lounge area. Thus, the cognitive system can be trained to recognize the activity of climbing a ladder or the activity of carrying boxes. The cognitive system can also be trained to recognize the activity of talking with another person or the activity of talking on the phone. Other example activities for this example include stocking shelves, talking with a customer, talking with another agent of the enterprise, talking on a mobile device, using a mobile device or computer. In operation, the cognitive system analyzes visual information (e.g., 3 seconds of a video stream) to determine if the data indicates that an agent is engaged in one of the activities the system was trained to recognize. If so, then the agent's activity is derived to be that recognizable activity. If not, then the agent is determined to be engaged in an unrecognizable activity.

Figure 2C:
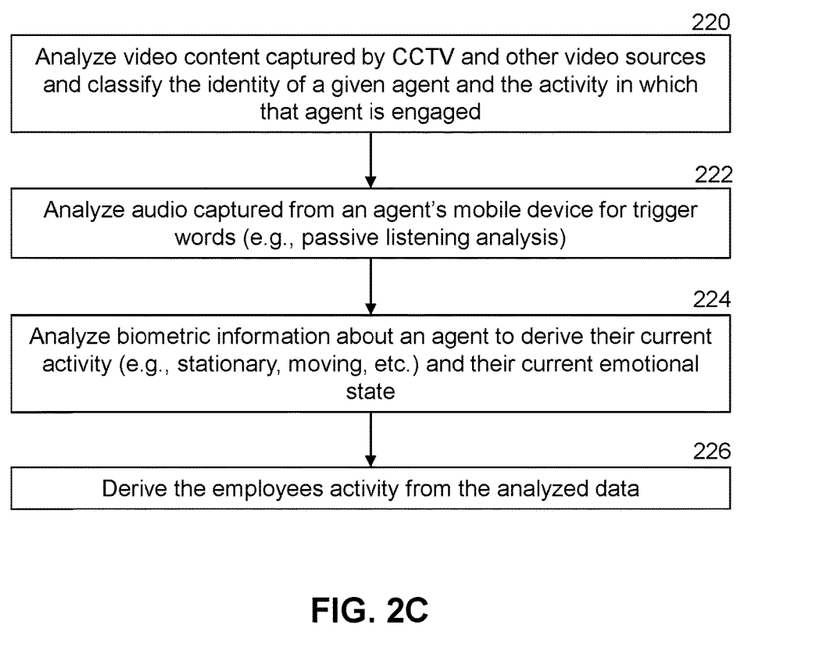

FIG. 2C provides more details about step 204 of FIG. 2A. In step 220, the CCD analyzes video content to determine if it can classify the agent's activity into one or more of the activities that the CCD was trained to recognize. The video content can be a small stream of video data (e.g., 3 seconds) and be collected periodically (e.g., every minute). Thus, the CCD does not need to determine an agent's current activity continuously but can assume, for example, that if the agent is talking with a customer, then the agent will likely be doing so for the next minute. However, the CCD can include the capability to determine when the agent was first classified as being engaged in the current activity and, thus, the duration the agent has been engaged in the current activity can be determined. Historical data can be collected about average durations for various activities and this historical data can be used to adjust the frequency of checking on the agent to determine the agent's current activity. Also, the audio data surrounding an agent can be used to adjust the frequency of checking on the agent to determine the agent's current activity. Phrases such as "Hello", "Please come back", etc. can be used to derive if a conversation is just beginning or likely ending.

In addition to the visual recognition of activities, audio data can be analyzed as well to determine an agent's current activity. One particular technique utilizes passive listening analysis. This technique employs predetermined keywords that an enterprise defines based on what is appropriate for that enterprise and the interactions its agents are likely to have. For example, audio data of a conversation of the agent is not analyzed until a keyword is recognized. Once a keyword is recognized, the next portion of the conversation is captured and analyzed. Natural language processing techniques can then be used to determine the topic and/or content of the agent's conversation. Furthermore, the words being used by an agent as well as the volume of the agent's speech can be helpful in deriving the current activity of the agent. For example, an agent that appears agitated in the video data and is speaking louder than normal to another person may be identified as an agent who likely should not be receiving an incoming call in the near future.

In step 224, the biometric information can be used to help identify the activity of the agent or the emotional state of the agent. An agent's heart rate and respiration rate can indicate their physical activity level and be used to help validate that the agent is climbing a ladder or carrying heavy items. In addition, however, the biometric data can be used to derive a person's emotional state. Currently known techniques utilize a combination of heart rate variability, movement analysis, and frequency of speech as indicators of emotions the person is experiencing. For example, the recognizable emotional states can be defined as "angry", "relaxed", "happy", "worried". etc.

A present location of the agent can also be helpful in the analysis performed by the CCD. The presence of the agent in the lounge area starting in the last 30 second may indicate that the agent is on break and should not receive an incoming call. The presence of the agent in a stock room and visual recognition of the agent carrying boxes may indicate that the agent should not be interrupted to receive an incoming call. The presence of the agent on the sales floor but talking with another employee may indicate that the agent likely an appropriate agent to receive an incoming call.

Figure 2D:
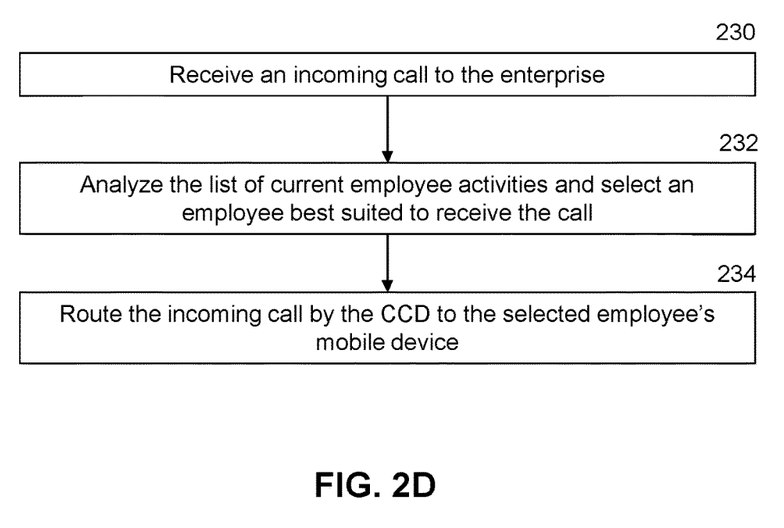

In step 226, the result of the individual analysis, or classifier, steps are combined to derive the current activity in which the agent is engaged. For example, visual recognition may classify an agent as being in conversation with a customer, the passive listening analysis detects the trigger word "buy" and determines the customer and agent are talking about making a purchase, and the emotional state analysis indicates the agent is relaxed FIG. 2D provides details about step 206 of FIG. 2A. In configuring the CCD, an enterprise defines the recognizable activities that an agent may be engaged in. Along with this information, the enterprise defines how appropriate that activity to be interrupted for an incoming call. Thus, the agents can be ranked, according to their current activity, for receiving incoming calls. Some activities, such as those related to safety concerns, may be defined as "never-to-be-interrupted" while other activities may be interrupted with an incoming call with certain activities being more appropriate for interruption than others. Thus, the CCD maintains a status of the agents presently on shift with regard to what activity they are currently engaged in and when an incoming call is received, in step 230, the CCD analyzes the status list, in step 232, to select the agent that is most appropriate to interrupt with the incoming call. In step 234, the CCD routes the incoming call to the mobile device of the selected agent. In instances where there are multiple agents appropriate to interrupt, the call can be routed randomly to one of them. In an instance where no agents are to be interrupted, the call may be routed to an automated system or voicemail. In an instance where the selected agent does not answer the incoming call within a predetermined time period, the CCD can route the incoming call to the next most-appropriate agent on the status list.

The routing of the incoming call can be adjusted by the enterprise defining additional rules. For example, even if the agent activity is appropriate to be interrupted, if the agent is presently in a location that is extremely noisy, then the CCD can prevent the call from being routed to that agent. Also, the enterprise can define threshold values that are applied during different parts of the shift for example. The threshold value limits whether or not an incoming call is forwarded such that any agent activity with a score or rank below the threshold value is not interrupted.

As described above a cognitive system has been described that can apply a plurality of different rules to attempt to recognize and classify an activity of an agent that they are current engaged in. A trained visual recognition system applies rules to analyze video data to determine which of a number of possible recognizable activities an agent is currently engaged in. Facial recognition can be used to identify agents of the enterprise as well as non-agents (e.g., customers) from the video data as well. In addition, passive listening analysis is used to capture a select portion of a conversation of the agent so that natural language processing and similar techniques can be employed to determine a context or meaning associated with the conversation. Similarly, biometric data is collected about the agent's current state and rules and analysis are applied to determine the agent's activity level and emotional state, for example. The cognitive system can then apply a second-level of rules and analysis to the individual analysis steps just described. A combination of the visually-derived activity, the content of the agent's conversation, and the emotional state of the agent can be analyzed to derive a complex definition of the agent's current activity. The cognitive system can, for example, derive that the agent is calmly speaking with a customer about making a purchase, or that the agent has just started climbing a ladder in a back store room, or that the agent is walking through a portion of the enterprise where loud machinery prevents easily hearing phone calls. The present disclosure contemplates any of a variety of functionally equivalent ways to assign a predetermined score to each of the derived activities in which the agent is engaged (e.g., 1-10, A-F, 1%-100%, etc.). The scoring being indicative of how appropriate it would be to interrupt the agent by routing an incoming phone call to the agent based on the engaged activity. The predetermined score can be defined by the enterprise. Each individual analysis result could be assigned its own score and then combined to calculate an overall score for the current activity. Some individual analysis values may be weighted differently than others and some individual analysis values may override all others if present (e.g., a loud location). Lastly, the cognitive system, once a current activity is derived for the agents, can create a status list of all the agents that reflects their current activity and is ranked based on the predetermined scores assigned to the particular activities. The cognitive system can then route an incoming call to a mobile device of the agent based on where that agent is relative to other agents in the ranked status list.

Figure 3:
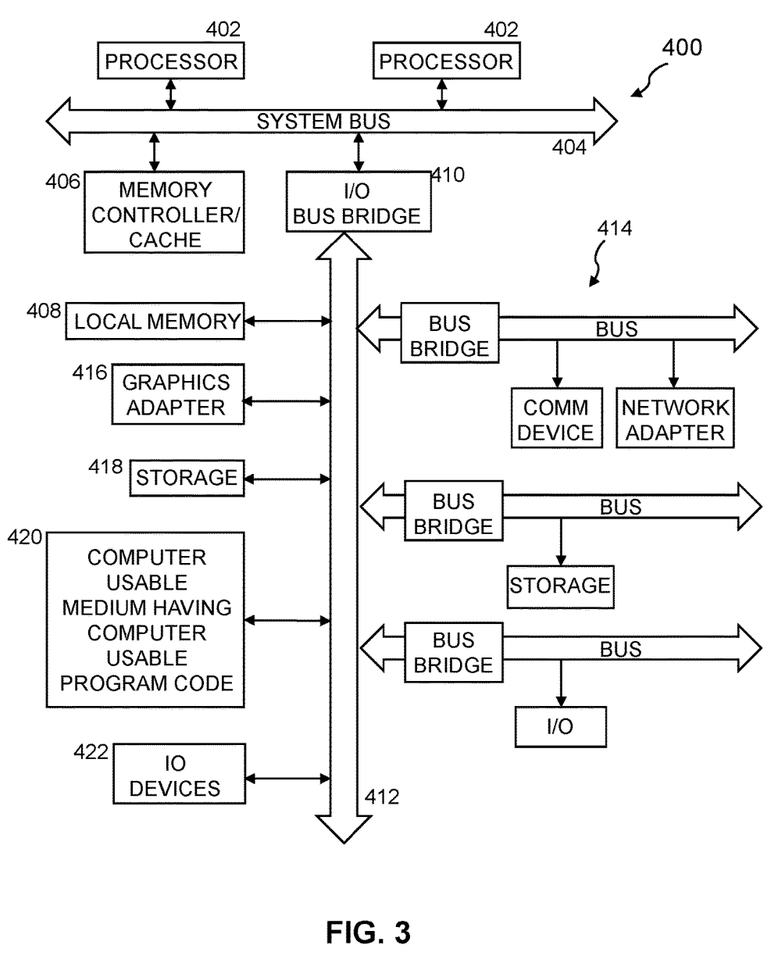
FIG. 3 depicts a block diagram of a data processing system in accordance with the present disclosure.

Referring to FIG. 3, a block diagram of a data processing system is depicted in accordance with the present disclosure. A data processing system 400, such as may be utilized to implement the hardware platform 102 or aspects thereof, e.g., as set out in greater detail in FIG. 1, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 2D. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The data processing system 400, such as may also be utilized to implement the cognitive system 102 or the cognitive call dispatcher, or aspects thereof, e.g., as set out in greater detail in FIG. 1.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   analyzing, by a computer, respective captured audio and video data related to each of a plurality of agents of an enterprise, each agent associated with a respective mobile device;
   determining, by the computer, a respective current activity in which each agent is engaged based on the agent's related captured audio and video data;
   selecting, by the computer, one of the plurality of agents to receive an incoming call based at least in part on the determined respective current activity in which each agent is engaged;
   routing, by the computer, an incoming call to the mobile device associated with the selected one agent; and
   adjusting, by the computer, a frequency of collecting video data for a particular agent based on the respective current activity in which that particular agent is engaged.

2. The method of claim 1, further comprising:
   determining, by the computer, a respective current emotional state of each agent,
      wherein selecting the one of the plurality of agents to receive an incoming call is based at least in part on the determined respective current emotional state of each agent.

3. The method of claim 1, further comprising:
   determining, by the computer, the respective current emotional state of each agent based on received biometric data of each agent.

4. The method of claim 1, further comprising:
   determining, by the computer, a respective current location of each agent,
      wherein selecting the one of the plurality of agents to receive an incoming call is based at least in part on the determined respective current location of each agent.

5. The method of claim 1, further comprising:
   performing, by the computer, passive listening analysis on the respective captured audio data related to each of the plurality of agents of the enterprise.

6. The method of claim 1, further comprising:
   associating, by the computer, a respective score value with each of a plurality of activities, the respective score value indicative of an appropriateness of interrupting the associated activity.

7. The method of claim 6, wherein each of the respective current activity in which each agent is engaged is one of the plurality of activities, and further comprising:
   assigning, by the computer, to each of the respect current activity in which each agent is engaged, its associated score value; and
   generating, by the computer, a status list of the respective current activity in which each agent is engaged, ranked based on the associated score values.

8. The method of claim 7, wherein selecting the one of the plurality of agents to receive an incoming call is based at least in part on the status list.

9. The method of claim 1, further comprising:
   identifying, by the computer:
      an identity of one or more of the plurality of agents based on the video data, and
      the respective current activity in which each of the one or more agents is engaged based on the video data.

10. A system, comprising:
    a processor programmed to initiate executable operations comprising:
       analyzing respective captured audio and video data related to each of a plurality of agents of an enterprise, each agent associated with a respective mobile device;
       determining a respective current activity in which each agent is engaged based on the agent's related captured audio and video data;
       selecting one of the plurality of agents to receive an incoming call based at least in part on the determined respective current activity in which each agent is engaged;
       routing, by the computer, an incoming call to the mobile device associated with the selected one agent; and
       adjusting, by the computer, a frequency of collecting video data for a particular agent based on the respective current activity in which that particular agent is engaged.

11. The system of claim 10, wherein the processor is programmed to initiate executable operations further comprising:
    determining a respective current emotional state of each agent,
       wherein selecting the one of the plurality of agents to receive an incoming call is based at least in part on the determined respective current emotional state of each agent.

12. The system of claim 10, wherein the processor is programmed to initiate executable operations further comprising:
    determining the respective current emotional state of each agent based on received biometric data of each agent.

13. The system of claim 10, wherein the processor is programmed to initiate executable operations further comprising:
    determining a respective current location of each agent,
       wherein selecting the one of the plurality of agents to receive an incoming call is based at least in part on the determined respective current location of each agent.

14. The system of claim 10, wherein the processor is programmed to initiate executable operations further comprising:
    performing passive listening analysis on the respective captured audio data related to each of the plurality of agents of the enterprise.

15. The system of claim 10, wherein the processor is programmed to initiate executable operations further comprising:

associating a respective score value with each of a plurality of activities, the respective score value indicative of an appropriateness of interrupting the associated activity.

16. The system of claim 15, wherein each of the respective current activity in which each agent is engaged is one of the plurality of activities, and wherein the processor is programmed to initiate executable operations further comprising:

assigning to each of the respect current activity in which each agent is engaged, its associated score value; and generating a status list of the respective current activity in which each agent is engaged, ranked based on the associated score values.

17. The system of claim 16, wherein selecting the one of the plurality of agents to receive an incoming call is based at least in part on the status list.

18. The system of claim 10, wherein the processor is programmed to initiate executable operations further comprising:

identifying:

an identity of one or more of the plurality of agents based on the video data, and the respective current activity in which each of the one or more agents is engaged based on the video data.

19. A computer program product, comprising:

a computer readable storage medium having program code stored thereon, the program code executable by a data processing system to initiate operations including:

analyzing, by the data processing system, respective captured audio and video data related to each of a plurality of agents of an enterprise, each agent associated with a respective mobile device;

determining, by the data processing system, a respective current activity in which each agent is engaged based on the agent's related captured audio and video data;

selecting, by the data processing system, one of the plurality of agents to receive an incoming call based at least in part on the determined respective current activity in which each agent is engaged;

routing, by the computer, an incoming call to the mobile device associated with the selected one agent; and adjusting, by the computer, a frequency of collecting video data for a particular agent based on the respective current activity in which that particular agent is engaged.

* * * * *